Feb. 1, 1949.  C. A. PACKARD  2,460,358
SELF-STARTING SYNCHRONOUS HYSTERESIS MOTOR
Filed Jan. 4, 1947  3 Sheets-Sheet 1
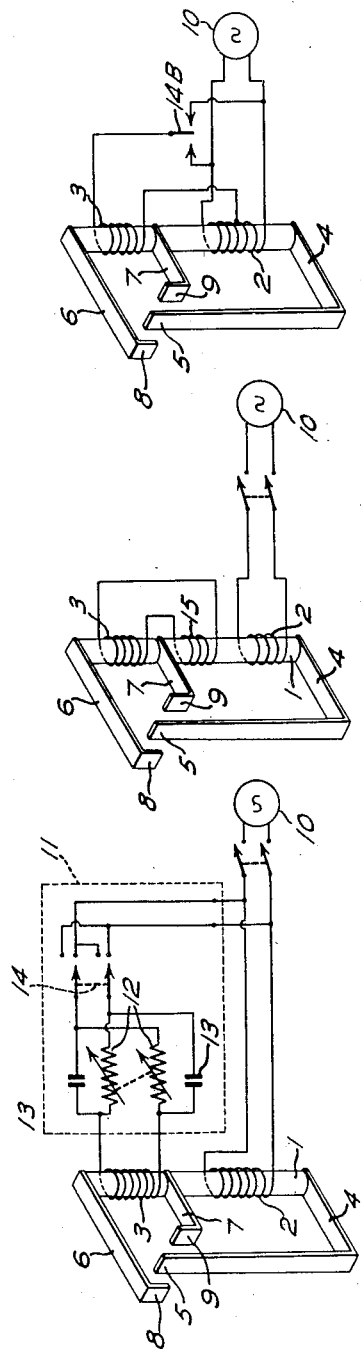
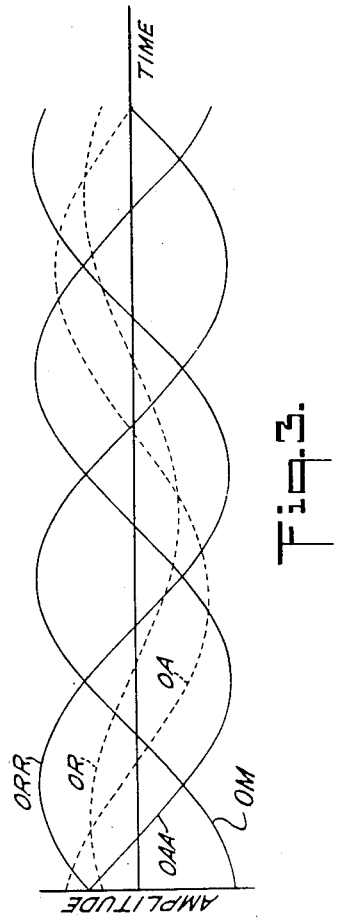
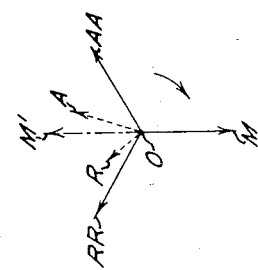
INVENTOR
CHARLES A. PACKARD
BY
Woodcock and Phelan
ATTORNEYS Feb. 1, 1949.  C. A. PACKARD  2,460,358
SELF-STARTING SYNCHRONOUS HYSTERESIS MOTOR
Filed Jan. 4, 1947  3 Sheets-Sheet 2
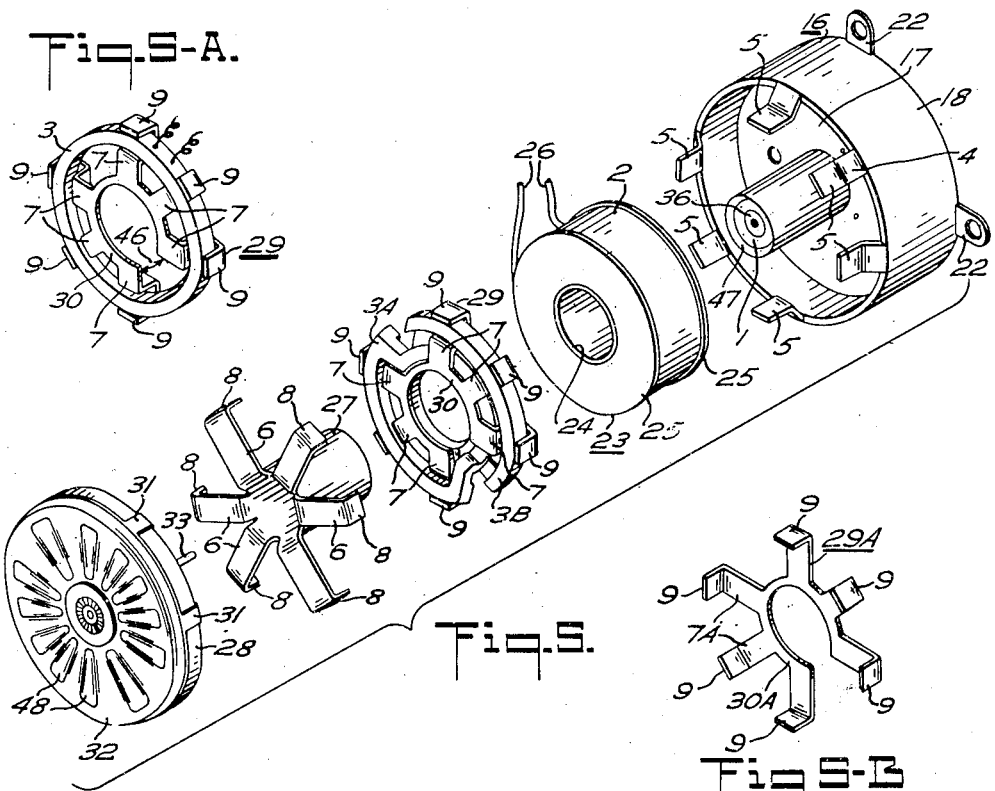
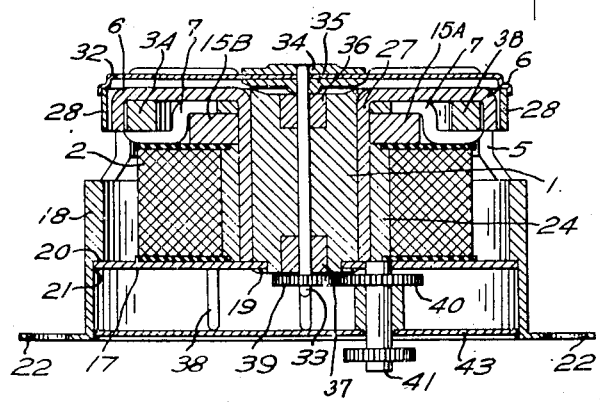
INVENTOR
CHARLES A. PACKARD
BY
Woodcock and Phelan
ATTORNEYS

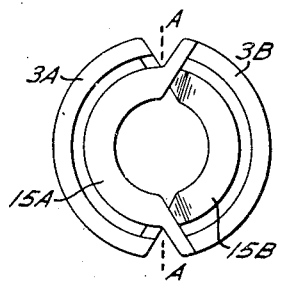
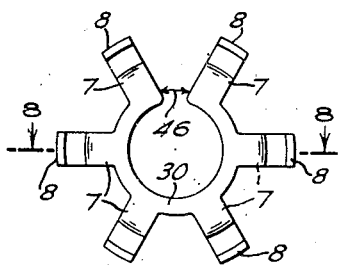
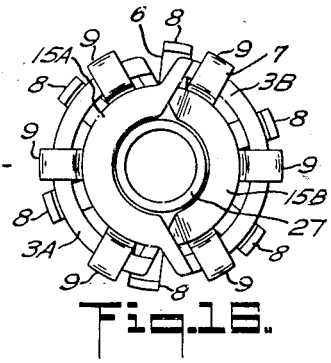
Fig.19.  Fig.7.  Fig.16.
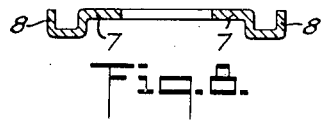
Fig.8.
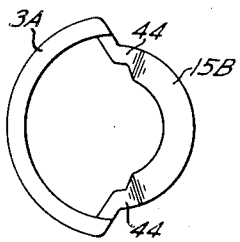
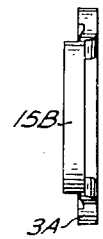
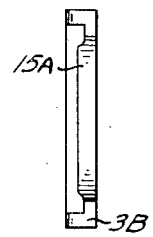
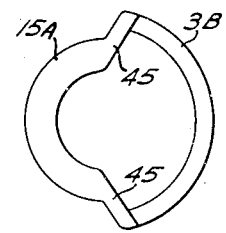
Fig.9.  Fig.10.  Fig.12.  Fig.13.
Fig.11.  Fig.14.
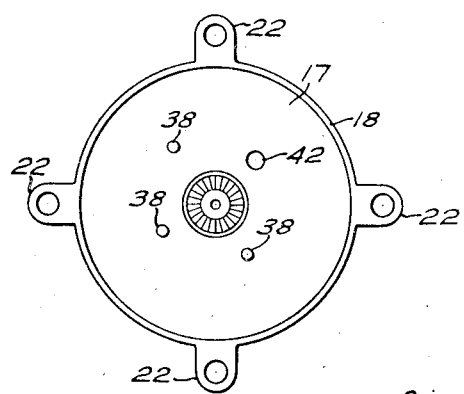
Fig.6-A.
INVENTOR
CHARLES A. PACKARD
BY
Woodcock and Phelan
ATTORNEYS Patented Feb. 1, 1949

2,460,358

UNITED STATES PATENT OFFICE 2,460,358

SELF-STARTING SYNCHRONOUS HYSTERESIS MOTOR

Charles A. Packard, Welaka, Fla., assignor to Struthers-Dunn, Inc., Philadelphia, Pa., a corporation of Pennsylvania Application January 4, 1947, Serial No. 720,171

15 Claims. (Cl. 172—278)

This invention relates to small self-starting synchronous motors of the type whose rotor is a steel ring, or equivalent, having appreciable magnetic remanence and which is suited for energization from a single-phase source of alternating current for actuation of timing switches, clocks, or other similar constant speed devices.

Many forms of such type motor have been devised, but in general they have been inefficient and subject to operating defects including one or more of the following: low starting torque, low running torque, poor synchronizing characteristics, erratic failure to start, and susceptibility to stopping and failure to start except within a limited range of supply voltage.

In these prior forms of hysteresis motor, the required rotating field is produced by use of shading coils to control the distribution of flux of the motor field coil between shaded and unshaded poles of the motor stator. Even with the best design and care in the spacing and alignment of the stator poles, the rotating magnetic field so obtained is inherently non-uniform and relatively weak.

It is the principal object of the present invention to provide an inexpensive self-starting synchronous motor of the hysteresis type which is smaller and more powerful than said prior forms and which is free of their aforesaid defects.

In accordance with the present invention, shading coils are not used; the distribution of magnetic flux between each main pole and the associated leading and lagging poles is obtained by using two flux-producing field coils, one termed the directional coil, and the other the main coil. In one form of the invention both field coils are connected to the same single-phase source of current, one, however, through a phasing network; in another form of the invention, the directional field coil is energized from a third winding of the motor stator, which serves as the secondary of a transformer, whose primary is the main field coil; in still another form, the desired phase and magnitude of the energizing current for the directional coil is obtained by tapping the main coil and connecting the directional coil between the tap and one side of the supply line. In all forms, because the phase and amplitude of the current traversing the directional coil may be independently predetermined, the flux components traversing the leading and lagging poles can be made of substantially equal amplitude and of substantially equal angular displacement with respect to the flux of the main pole and it is possible at least closely to approximate a balanced three-phase distribution of flux, a result inherently unattainable in hysteresis motors using shading coils.

Further, and more especially in accordance with the invention, the air gap between one set of minor poles and the rotor is different from the air gap between the rotor and the other set of minor poles, to aid in accomplishment of the desired uniform distribution of flux between the poles.

In accordance with another aspect of the invention, a shell of magnetizable material from which the main pole tips are formed and which encloses the core and coil assembly, extends beyond them to form a housing for reduction gearing driven from the rotor shaft, which extends axially through the core.

The invention further resides in features of construction, combination and arrangement hereinafter described and claimed.

For a more detailed understanding of the invention and for illustration of preferred forms thereof, reference is made to the accompanying drawings, in which:

Fig. 1 schematically illustrates one set of stator poles, the motor field windings, and one mode of obtaining dephased currents in the field windings;

Figs. 2 and 3 are vector diagrams and time-amplitude curves referred to in discussion of principles underlying the invention;

Figs. 4 and 4A are similar to Fig. 1, but disclose other arrangements of obtaining dephased field currents;

Fig. 5 is an exploded view showing the component sub-assemblies of a motor;

Figs. 5A and 5B illustrate modifications of one of the sub-assemblies of Fig. 5;

Fig. 6 is a sectional view of the assembled motor;

Fig. 6A is a bottom view of Fig. 6 with the cover plate and gearing omitted;

Figs. 7 and 8 are top plan and side elevational views, respectively, of one of the magnetic members of Fig. 5;

Figs. 9, 10 and 11 are, respectively, top plan, end elevational and front elevational views of one of the coil elements shown in Fig. 5;

Figs. 12, 13 and 14 are end elevational, top plan and front elevational views, respectively, of another coil element shown in Fig. 5;

Fig. 15 is a top plan view of the coil elements of Figs. 9 and 13 as superimposed prior to assembly; and Fig. 16 is a plan view of a sub-assembly of elements shown in Fig. 5.

For preliminary discussion of principles involved in construction of the complete motor later herein described, reference is made to Fig. 1 which, for simplicity and clarity of explanation, discloses only one set or triad of stator poles; that is, one "main" pole and an associated pair of "minor" poles. It shall be understood, as will more fully later herein appear, that all of the main poles of the motor are of the same instantaneous magnetic polarity; that all of the leading minor poles are of the same instantaneous polarity; and that all of the lagging minor poles are of the same instantaneous polarity. The following preliminary discussion, although concerned with only one set of poles, equally applies to every other set of poles of a complete stator. It shall also be understood that as the flux distribution approaches a balanced three-phase distribution the distinction, in a magnetic sense, between the main and minor poles becomes vanishingly small but for purpose of distinguishing between the poles, in a mechanical sense, the terminology of main and minor poles will be retained throughout.

Upon the core 1, common to all of the poles, are disposed two field windings 2 and 3, the former constituting the main field winding, and the latter the directional field winding or coil. From the lower end of the core 1, there extends outwardly and upwardly a magnetic member 4 terminating in a main pole tip 5 separated by a small air gap from a hardened steel rotor ring, not shown in Fig. 1. From the upper part of core 1 there extend two radial arms 6 and 7 terminating respectively in pole tips 8 and 9 disposed on opposite sides of the main pole tip 5 and also separated by small air gaps from the rotor ring. The pole tips 8 and 9 form the leading and lagging poles of the triad 5, 8 and 9; which is the leading pole and which is the lagging pole depends, as later appears, upon the desired direction of rotation of the motor.

Considering first only the magnetic flux resulting from energization of the main coil 2 and ignoring leakage, it is axiomatic since the magnetic circuits are interdependent, that at any instant the total magnetic flux entering or leaving the minor pole tips 8 and 9 must equal the magnetic flux concurrently leaving or entering the main pole tip 5. Referring to Fig. 2 and assuming the rotating vector OM represents the flux entering or leaving the main pole 5, the vector OM' equal and opposite to vector OM represents the vector sum of the flux concurrently leaving or entering the minor pole tips 8 and 9. Assuming, in accordance with prior practice, that the distribution of the flux is effected by a shading coil, the respective flux components entering or leaving the poles 8 and 9 may be represented by the vectors OA and OR of substantially different magnitude and substantially differently angularly spaced from their resultant OM'. To obtain the angularly displaced vectors OA and OR by use of shading coils inevitably and inherently results in an inequality of these vectors which increases with increase of the phase displacement sought, and which moreover can never, regardless of the design of the shading coil or the associated magnetic circuits, exceed about 80 degrees.

The phase relation shown between the vectors OA, OR and OM, Fig. 2, and by the corresponding time-amplitude curves OA, OR and OM, of Fig. 3, affords about the best flux distribution attainable by use of shading coils, but the motors using them are subject to the serious operating defects above noted. The phase angles of these vectors and their substantially different magnitudes are far from the ideal balanced 120° phase relation shown by vectors OAA, ORR and OM, of Fig. 2, and their corresponding time-amplitude curves OAA, ORR and OM of Fig. 3. It will be understood by those skilled in the art, that curves OAA, ORR and OM as viewed on an oscilloscope are not usually true sine curves because of presence of harmonics due to saturation and other effects; this, however, does not affect the validity of statements herein concerning the relative magnitudes of the vectors and their phase relations at any particular instant.

By the use of the directional coil, Fig. 3, the phase and magnitude of whose energizing current can be independently selected or predetermined without limitations imposed by the main field coil 2 and its flux, it is readily feasible to obtain substantial equality of the vectors OA, OR, both in magnitude and as to their angular displacements, and even closely to approximate the balanced 120° phase relationship shown by the vectors and curves OAA, ORR and OM.

Reverting to Fig. 1, both the main field coil 2 and the directional coil 3 are connected to a suitable source 10 of a single-phase alternating current, for example, a 110 volt, 60 cycle line. The connections to one of the coils, preferably the directional coil 3, includes a phase-shifting network or device generically represented by the block 11. The phase-shifting device or arrangement is, in Fig. 1, a resistance-reactance network comprising resistors 12 and capacitors 13 whose magnitudes are selected or adjusted to obtain the desired phase and magnitude of the energizing current for coil 3. With this type of stator construction, unlike those using shading coils, there are two independently produced fluxes, one by the coil 2 and the other by coil 3, having common magnetic circuits including the pole tips 5, 8 and 9.

As the phase relation and magnitude of these two fluxes may be independently predetermined or adjusted, the condition that the total flux entering any of the poles must be equal to the vector sum of the flux components entering the other two poles, can be met by a flux distribution in which the flux components entering the minor poles are substantially equal in magnitude, and they have substantially equal phase displacements with respect to the flux leaving the main pole: on the contrary, with a shading coil, the condition can be satisfied only with a distribution in which the flux components entering the minor poles are of unequal magnitude with respect to each other and of unequal phase displacements with respect to the major pole flux.

By providing a switch 14, the direction of current flow to the coil 3 may be reversed effectively to interchange the phase relations of the vectors OAA and ORR with respect to the vector OM and so change the direction of rotation of the rotating magnetic fields produced by the poles. Otherwise stated, assuming poles 8 and 9 are leading and lagging poles respectively for one position of switch 14, then upon reversal of the switch poles 8 become lagging poles and poles 9 become leading poles. A shaded pole hysteresis motor cannot be reversed under control of and at the will of an operator.

In the arrangement shown in Fig. 4, the directional coil 3 is energized from a third winding 15 disposed on core 1 and serving as the secondary of a transformer whose primary is the main coil 1. The phase of the current in coil 3 with respect to that in coil 1 may be selected or predetermined by the direction of winding of the coils 3 and 15 and the poling of the connections between them; the magnitude of the current flowing in coil 3 may be selected, within a wide range, by choice of the turns ratio of the coils 1 and 15 and by the design of coil 3. This is again in contrast with shaded coil motors of which it is characteristic the phase and magnitude of the current in the shading coil cannot be independently predetermined. If desired, a switch may be provided to reverse the connections between the directional coil 3 and its current source, the secondary coil 15, and so obtain rotation of the motor in either direction, at will.

With the arrangement shown in Fig. 4A, the desired phase relation between the currents in the two field coils 2 and 3 can be obtained without need to use the external phasing device or network 11. Instead, the main coil 2 is tapped at or near its center and the directional coil 3 is connected between the tap and one or the other side of the supply source 10. If desired, a switch 14B, of the single pole double-throw type, may be provided to permit reversal of the motor at will. The main coil 2 so far as energization of coil 3 is concerned serves an auto-step-down transformer reducing the voltage applied to coil 3 and so permitting the desired number of ampere-turns to be obtained in the space available for coil 3 without recourse to use of fine wire: the tapping of coil 3 and the proportioning of the inductance and resistance of coils 2 and 3 obtains the desired phase relation and relative magnitudes of the currents respectively traversing the coils.

A preferred motor construction employing a suitable number of pole sets or triads, such as above described, and suited for use with the directional coil 3 of Figs. 1, 4 or 4A, will now be described.

Referring to the exploded view, Fig. 5, the stator sub-assembly 16 comprises the core 1, the disk 17 and the cylindrical shell 18, all of suitable magnetizable material as iron or soft steel. In assembly of this unit of the motor, the disk 17, having a central aperture for such purpose, is slipped over the reduced end of the core 1, and the projecting ends of the core then spread outwardly to form a clamping flange 19, Fig. 6. The disk 17 is then placed within the shell 18, with its periphery engaging the inner circumference of the shell, and with its upper face adjacent the periphery abutting the flange or shoulder 20 of the shell. The shell 18 and disk 17 are then permanently united as by a welded or brazed joint 21. The mounting feet 22 for the motor are formed by outwardly bending ears or lugs of the original cylindrical stock forming the shell 18. The arms and main pole tips 5 are also integrally formed from the shell 18 by cutting and bending operations. In the particular assembly shown, there are six main pole tips 5 to afford a rotor speed of 600 revolutions per minute when the motor is energized from a 60 cycle source.

The main field coil assembly 23, Fig. 5, comprises a spool formed by the sleeve 24 of magnetizable material and two annular end members 25 of fibre or other suitable insulating material. The main coil 2 wound on the spool is provided with leads 26 for connection to the source of current.

The inner diameter of the sleeve 24 of the field coil assembly 23 is suited snugly to receive the sleeve 27, Figs. 5 and 6, from whose upper end extends the radial arms 6 equally angularly spaced and corresponding in number with the main pole tips 5 of shell 18. The arms 6 and the tips 8 at the outer ends thereof may be formed by splitting the original sleeve stock and bending the arms so defined to the position shown in Fig. 5. The faces of the pole tips 8 are parallel to the axis of the sleeve 27, and the distance from the axis to the face is slightly less than the internal diameter of the steel ring 28 forming the armature of the motor. The internal diameter of the sleeve 27 is suited snugly to receive the core member 1, as shown in Fig. 6.

The spider 29, Figs. 5, 5A, 7 and 8, may be formed by stamping and bending from a flat strip of iron or soft steel to provide the radial arms 7, each terminating in a pole tip 9, and joined to each other by a central web member 30 forming an aperture suited closely to fit the sleeve 27. As most clearly shown in Fig. 8, the arms 7 of spider 29 are bent to form a recess for receiving the multi-turn directional coil 3 of Fig. 5A or the two halves 3A and 3B of a single-turn split directional coil, Fig. 5. The arms 7 of this member of the stator are equally angularly spaced and correspond, in number, with the number of arms 6 and the number of main poles 5.

In the preferred mode of assembling the stator, the spider 29 of the intermediate poles 9 with the directional coil 3 in place, is slipped over the sleeve 27 of the upper poles 8; the field coil unit 23 is then slipped on sleeve 27, and this assembled group of units is then slipped over the core 1 to bring the parts into the relative position shown in Fig. 6. These parts are then permanently locked in position as by forcing over a thin flange 47 at the upper periphery of the core 1.

When the motor is to be reversible, whether the pole tips of each pair of tips 8 and 9 are respectively to the right or left of the intermediate main pole tip 5 is of no particular consequence as the direction of rotation of the motor can be controlled by the reversing switch 14. When, however, the directional coil is of the split type, such as coil 3A, 3B, to be used in non-reversible motors, the two spiders must be assembled on core 1 with that relation of pole tips 5, 8 and 9 which will afford the desired direction of rotation.

The rotor assembly comprises the hardened steel ring 28 suitably held as by the ears or lugs 31 to a thin, light disk 32 of non-magnetic material, preferably aluminum. The lugs 31 may be integral with the disk and bent outwardly and downwardly therefrom and then upwardly, Fig. 6, to embrace the lower edge of the rotor ring 28. The raised portions 48 pressed from the disk material serve to stiffen the disk and may be used as reflecting surfaces which afford a stationary spoke pattern when the rotor, while running, is viewed under a neon light or equivalent energized from source 10. The rotor shaft 33 may be fastened to the rotor disk 32 by the clamping washers 34—35, the latter having an extension or shank which forms a bearing preferably engaging a washer interposed between it and the upper face of bearing member 36 tightly fitted into the upper end of the core 1. The shaft 33, Fig. 6, extends axially of the core member 1, and at the lower end thereof passes through a second bearing member 37 tightly fitted in the lower end of the core. The bearing members 36 and 37 may be of any suitable material such as bronze, and the bearing washer 35 of the rotor may be of brass or other suitable bearing material: the interposed washer is preferably of ferrous metal. From the lower face of the disk 17 may extend several stud shafts 38 to receive gears forming a reduction train between a gear 39 attached to the lower end of the rotor shaft 33 and a gear 40 on the output shaft 41 whose inner end is supported in a hole 42 in disk 17 and which passes through a cover plate 43 suitably fastened, as by soldering, in the lower end of the shell 18. The number and diameters of the gears so enclosed within the housing formed by shell 18 between the disk 17 and cover plate 43 depends upon the desired output speed of the motor. The inclusion of the gear box as an integral part of the motor within the shell 18 affords a very compact construction and reduces to a minimum the overall dimensions of the motor, which, by way of example, is approximately one and one-eighth inches including a cover not shown, which clears the rotor and snugly slidably fits the outside of shell 18.

When the motor is of the form shown in Fig. 4, having its directional coil energized from a third winding on the core and when it is not desired to provide for reversibility of the motor, there may be used the dual composite coil construction shown in Figs. 9 to 15. Each of the two coil elements, and as more fully explained hereinafter, forms one-half of the directional coil 3 and one-half of the secondary winding 15.

One of the coil elements, Figs. 9, 10 and 11, comprises a half ring-section 3A of diameter and thickness suited for reception by the recesses in the spider 29 and a half-ring section 15B of smaller internal diameter approximately equal to or slightly larger than the external diameter of sleeve 27. The two half rings are joined by integral connecting sections 44, 44'. The two sections 3A, 15B are offset or in different planes so that when assembled with the minor pole elements, Figs. 5, 6 and 16, the directional coil section 3A is between the upper pole arms 6 and the intermediate pole arms 7, as viewed in Fig. 6, whereas the secondary coil section 15B is below the intermediate pole arms 7, Fig. 6.

The other coil element, Figs. 12, 13 and 14, comprises a half-ring section 3B of diameter and thickness suited for reception by the recesses of spider 29 and a half-ring section 15A suited to fit over sleeve 27, Fig. 16. These two half-rings are joined by integral connecting sections 45, 45 and are suitably offset so that as assembled with the minor pole elements, Fig. 16, the directional coil section 3B is between the upper arms 7 and the intermediate arms 6, whereas the secondary coil section is below the intermediate pole arms 7, Fig. 6.

To assemble the combined directional and secondary coil elements on spider 29, they are first superimposed as shown in Fig. 15 and then each is swung about axis A—A to form an X so that the spider 29, being slotted at 46 for that purpose, may be slipped on and manipulated to bring these elements into the relative positions shown in Figs. 5 and 16. When this group of elements is assembled on core 1 as above described to form the stator, the two halves 3A, 3B of the directional coil 3 are between the upper pole arms 6 and the intermediate pole arms 7, as viewed in Fig. 6, whereas the two halves 15A, 15B of the secondary winding 15 encircle the core 1 below arms 7, as viewed in Fig. 6, and so are traversed by all of the flux produced by the primary winding 2. Both coil elements 3A, 15B and 3B, 15A and their connecting sections are of heavy copper stock and consequently of very low electrical resistance. As the voltages involved are low, it is not necessary to provide insulation between these coils and the pole arms. The natural oxide on the surface of the copper provides sufficient insulation, and moreover the current path through the iron arms is of materially higher resistance so that little, if any, current flows through the iron. When the coil elements are assembled on the spider 29, they are held apart by the spider arms so that there is no electrical contact or short-circuit at the cross-overs of the connections 44, 44' and 45, 45.

The turns ratio of the main field coil 2 and the secondary 15A, 15B is such that a heavy current is supplied to the directional coil 3A, 3B and the resultant flux of the directional coil is of magnitude affording substantial equality of the total flux components of each pair of poles 8 and 9; moreover the coils are so proportioned that there is substantial equality of phase displacement of the flux components of each pair of poles 8 and 9 with respect to the flux of the associated main pole 5.

When the directional coil is to be energized directly from source 10, in accordance with Fig. 1, 4A, or equivalent, it comprises a large number of turns of smaller wire to obtain the same number of ampere turns as coil 3A, 3B at the higher voltage and within the same coil volume to permit either type of directional coil to be used with the same stator elements. The secondary coil 15 is, of course, not used when a directly excited directional coil, Fig. 1 or 4A, is used.

When the secondary coil is omitted and a directly excited directional coil is used, a simpler spider 29A, Fig. 5B, may be used without changing the dimensions or form of any of the other stator components. The stator may be assembled as above described without any change in procedure enforced by use of spider 29A instead of spider 29.

In Figs. 5 to 16, the various parts are drawn to scale and show relative dimensions and proportions of the stator components of small motors constructed and operated in accordance with the invention. By way of specific example, for small motors suited for operation of clocks, the core 1 may be about 5/8" diameter and 1 1/8" long: from these dimensions, those of the other components may be determined by reference to the scale drawings.

To aid in attainment of close approximation to a balanced 120° phase displacement of the fluxes, the arms 6 are somewhat longer than the arms 7, so that the air gaps between the pole faces 8 and the rotor ring are greater than the air gaps between pole faces 7 and the rotor. The difference need be only a few thousandths of an inch, but is significant because all gaps are small to attain high torque and reduce the leakage flux as much as possible. For 110 volt, 60 cycle operation, the field coil 2 for Fig. 4 may be 4625 turns of #37 AWG copper wire: the coil 2 is center-tapped and may be 6200 turns of #39 AWG copper wire if for use in the modification shown in Fig. 4A. The directional coil when for use in the modification of Fig. 4A may be 2000 turns of #39 AWG copper wire. When in accordance with the modification of Fig. 4, a third coil 15 is used as a transformer secondary for energization of the directional coil, a composite directional coil 3A, 3B and transformer coil 15A, 15B may be used as above specifically described in connection with Figs. 9 to 16. In all of these motors and as above discussed in connection with Figs. 2 and 3, the flux components traversing the poles 8 and 9 are substantially equal in magnitude and substantially equally displaced in phase with respect to the flux traversing the poles 5 and the flux distribution in fact closely approximates a balanced three-phase relation represented by the vectors and curves OAA, ORR and OM of Figs. 2 and 3—a relation not obtainable in hysteresis motors employing shading coils.

It shall be understood the invention is not limited to the particular construction shown, but that modifications may be made within the scope of the appended claims.

What is claimed is:

1. A single-phase self-starting synchronous motor comprising a field structure including a core member and a plurality of magnetic pole triads in circular array concentric with said core and having two poles of each triad extending from opposite ends of the core and on opposite sides of the third pole of the triad forming interdependent magnetic circuits, and means for effecting a substantially balanced three-phase distribution of flux between said poles comprising two separately energizable field coils disposed about said core respectively on opposite sides of the magnetic structure forming said third poles.

2. A single-phase self-starting synchronous motor comprising field structure including a core member and a plurality of magnetic pole triads in circular array concentric with said core and having two poles of each triad extending from opposite ends of the core and on opposite sides of the third pole of the triad forming interdependent magnetic circuits, and means for connecting said field coils to a single-phase source of alternating current, the connections to one of said coils including a phasing network.

3. A single-phase self-starting synchronous motor comprising field structure including a core member and a plurality of magnetic pole triads in circular array concentric with said core and having two poles of each triad extending from opposite ends of the core and on opposite sides of the third pole of the triad forming interdependent magnetic circuits, and means electrically interconnecting said coils to single-phase alternating current for relatively de-phased energization therefrom.

4. A single-phase self-starting synchronous motor comprising field structure including a core member and a plurality of magnetic pole triads in circular array concentric with said core having two poles of each triad extending from opposite ends of the core and on opposite sides of the third pole of the triad forming interdependent magnetic circuits, means for connecting said field coils to a single-phase source of alternating current for de-phased energization therefrom, and switching means for reversing the connections to one of said coils to effect reversal of said motor.

5. A single-phase self-starting synchronous motor comprising field structure including a core member and a plurality of magnetic pole triads in circular array concentric with said core and having two poles of each triad extending from opposite ends of the core and on opposite sides of the third pole of the triad, means for effecting a substantially balanced three-phase distribution of flux between said poles comprising two field coils disposed about said core respectively on opposite sides of the magnetic structure forming said third poles, means for connecting one of said field coils to a source of single-phase alternating current, and means for separately energizing the other of said field coils comprising a third winding disposed about said core and serving as the secondary of a transformer whose primary is one of said field coils.

6. A single-phase self-starting synchronous motor comprising field structure including a core member and a plurality of magnetic pole triads in circular array concentric with said core and having two poles of each triad extending from opposite ends of the core and on opposite sides of the third pole of the triad, means for effecting a substantially balanced three-phase distribution of flux between said poles comprising two field coils disposed about said core respectively on opposite sides of the magnetic structure forming said third poles, conductors for connecting one of said coils to a source of single-phase alternating current, and connections from the other of said coils to a tap of said one of said coils and to one of said conductors.

7. A stator for a single-phase synchronous self-starting motor comprising a magnetizable core, a main field coil about said core, two magnetizable members at one end of said core, each having equally angularly spaced radial arms equal in number to those of the other member and angularly displaced with respect thereto, a magnetizable shell extending from the other end of said core surrounding said coil and terminating in pole members equally angularly spaced and each between a radial arm of one of said members and a radial arm of the other of said members, a directional field coil disposed about said core between said magnetizable members, and means for separately energizing said coils by currents of predetermined phase relation.

8. A stator for a single-phase synchronous self-starting motor comprising a magnetizable core, a main field coil about said core, two magnetizable members at one end of said core, each having equally angularly spaced radial arms equal in number to those of the other member and angularly displaced with respect thereto, a magnetizable shell extending from the other end of said core surrounding said coil and terminating in pole members equally angularly spaced and each between a radial arm of one of said members and a radial arm of the other of said members, a directional field coil disposed about said core between said magnetizable members, and means for independently connecting said field coils to a source of single-phase alternating current, the connections to one of said coils including a phasing arrangement.

9. A stator for a single-phase synchronous self-starting motor comprising a magnetizable core, a main field coil about said core, two magnetizable members at one end of said core, each having equally angularly spaced radial arms equal in number to those of the other member and angularly displaced with respect thereto, a magnetizable shell extending from the other end of said core surrounding said coil and terminating in pole members equally angularly spaced and each between a radial arm of one of said members and a radial arm of the other of said members, a directional field coil disposed about said core between said magnetizable members, means for energizing said field coil comprising a third winding disposed about said core between said other end thereof and one of said magnetizable members, and means for connecting said main field coil to a source of single-phase alternating current.

10. A stator for a single-phase synchronous self-starting motor comprising a magnetizable core, a magnetizable shell extending from one end of said core and terminating in a plurality of equally angularly spaced poles concentric with said core, a sleeve of magnetizable material slidable over said core and having radial arms extending therefrom corresponding in number and angular spacing with the pole members of said shell, a spider of magnetizable material slidable over said sleeve and having radial arms corresponding in angular spacing and number with those of said sleeve, a directional field coil concentric with said core and disposed between the arms of said sleeve and spider, and a main field coil disposed within said housing and about said core between said spider and said end of the core.

11. A single-phase synchronous self-starting motor comprising a magnetizable core, a magnetizable shell extending from one end of said core and terminating in a plurality of equally angularly spaced poles concentric with said core, a sleeve of magnetizable material slidable over said core and having radial arms extending therefrom corresponding in number and angular spacing with the pole members of said shell, a spider of magnetizable material slidable over said sleeve and having radial arms corresponding in angular spacing and number with those of said sleeve, a directional field coil concentric with said core and between the arms of said sleeve and spider, a main field coil disposed within said housing and about said core between said spider and said end of the core, and a rotor element comprising a hardened steel ring adjacent the magnetic triads formed by said poles and arms, a disk of non-magnetizable material for supporting said ring, and a shaft attached to said disk and extending through said core axially thereof.

12. A single-phase self-starting synchronous motor comprising a magnetizable shell terminating at one end in a circular array of pole pieces, a disk of magnetizable material extending interiorly and across said shell at a substantial distance from the other end thereof, a core member attached at one end to said disk and extending axially of the shell and terminating substantially opposite said pole pieces thereof, two spiders of magnetizable material extending from the other end of the core and each forming pole pieces corresponding in number and angular displacement with those of the shell, a directional coil between said spiders, a main field coil between said disk and one of the spiders, a rotor disk whose periphery is adjacent said pole pieces, a rotor shaft extending through said core, and gearing driven from said motor shaft and disposed within said shell between said disk and said other end thereof.

13. A stator for a single-phase synchronous self-starting motor comprising a magnetizable core, a field coil about said core and energizable from a source of single-phase alternating current, two magnetizable pole members at one end of said core, each having angularly spaced radial arms angularly displaced with respect to the arms of the other member, and coil elements each having a section disposed between said members to serve as part of a directional field coil and a section disposed about said core beyond said members to serve as part of a secondary winding whose primary is said field coil.

14. A magnetic device comprising a magnetizable core, magnetic members extending from a portion of said core common to interdependent magnetic circuits of said members, and means for determining the distribution of the magnetic flux of the core between said magnetic members comprising a coil between said members and a winding for supplying current to said coil disposed about said core and traversed by the total flux of said magnetic members.

15. A magnetic device comprising a magnetizable core, a field winding about said core, magnetic members extending from a portion of said core common to interdependent magnetic circuits of said members, and means for determining the distribution of the magnetic flux of the core between said members comprising a coil between said members and a winding for supplying current to said coil disposed about said core for traverse by the total flux of said magnetic circuits and serving as the secondary of a transformer whose primary is said field winding.

CHARLES A. PACKARD.

REFERENCES CITED

The following references are of record in the file of this patent:

UNITED STATES PATENTS

| Number | Name | Date |
| --- | --- | --- |
| 2,070,447 | Morrill | Feb. 9, 1937 |
| 2,227,894 | Elms | Jan. 7, 1941 |